May 20, 1969        D. F. HOTZ        3,445,787
TUNABLE, FREQUENCY STABILIZED LASER
Filed Aug. 1, 1966
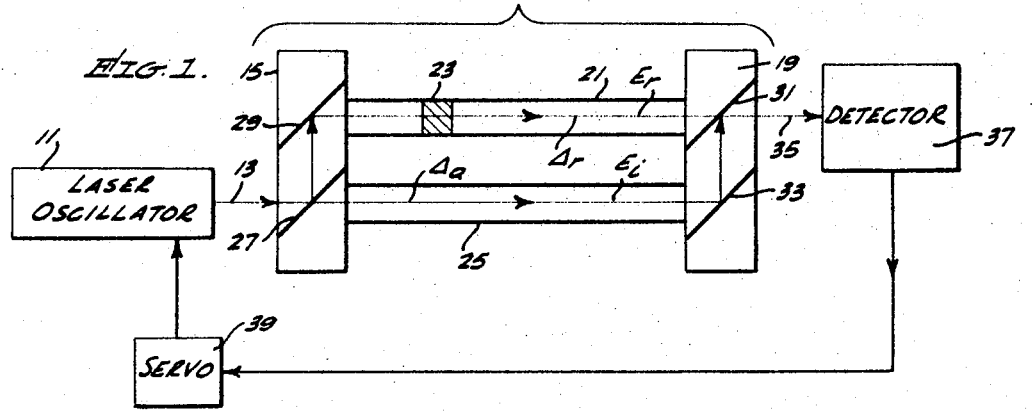
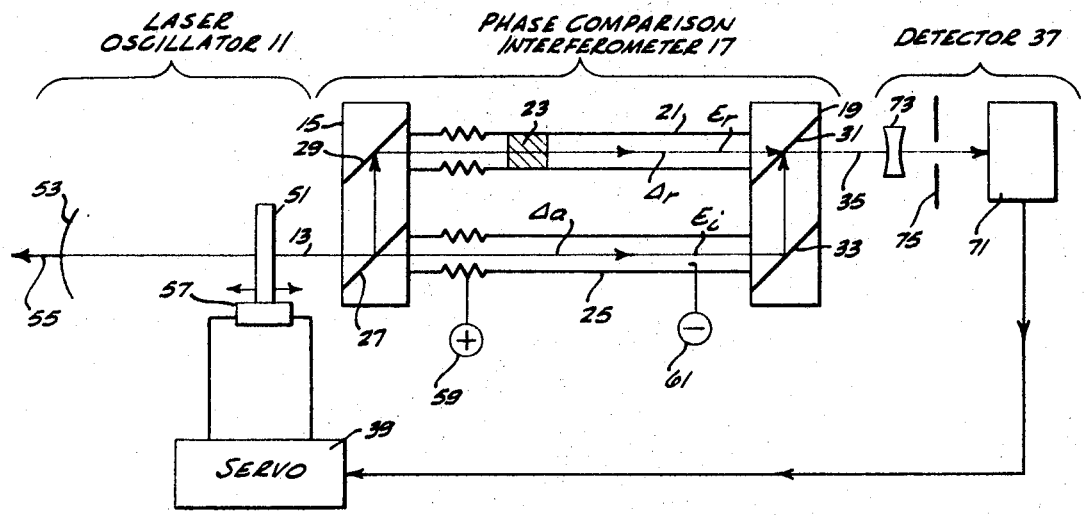
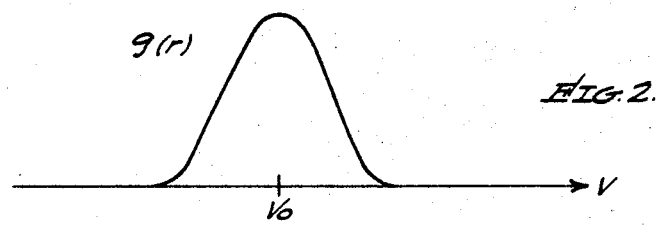
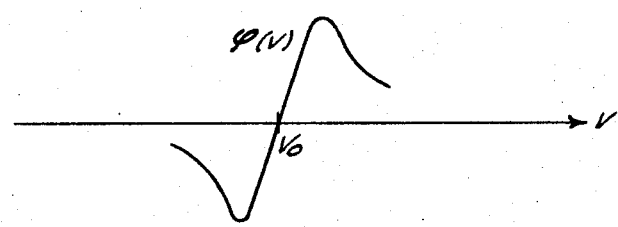
INVENTOR.
DAVID F. HOTZ,
ATTORNEY.

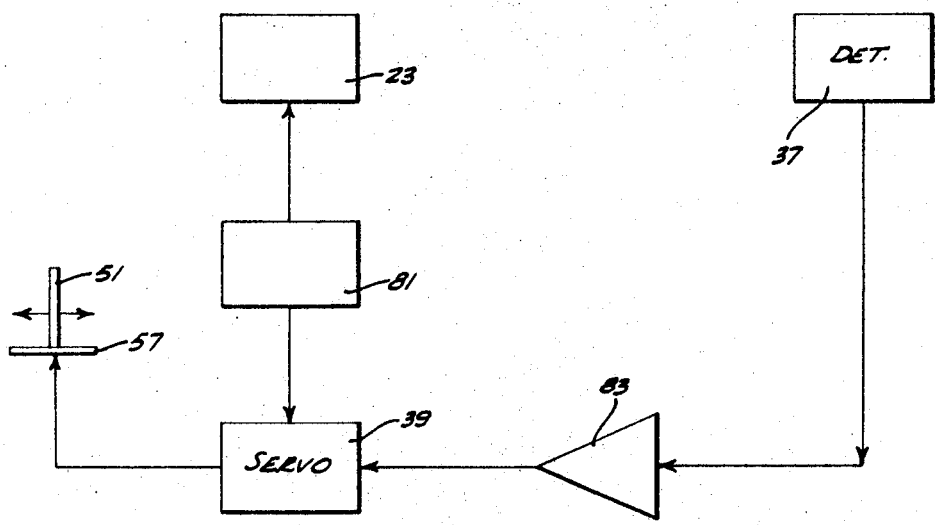

United States Patent Office 3,445,787
Patented May 20, 1969

3,445,787
TUNABLE, FREQUENCY STABILIZED LASER
David F. Hotz, San Diego, Calif., assignor to Hughes Aircraft Company, Culver City, Calif., a corporation of Delaware
Filed Aug. 1, 1966, Ser. No. 569,310
Int. Cl. H01s 3/10
U.S. Cl. 331—94.5           5 Claims This invention relates to a stabilized laser oscillator and more particularly to a laser oscillator that may be set to oscillate in a stable manner anywhere within the half-power points of the gain linewidth for the particular laser transition employed.

The need for and advantages of a stabilized source of oscillations is well known in the radio frequency (RF) electromagnetic energy art. The need for and advantages of such a source of oscillations also applies to the much higher frequency near optical and optical frequency range generators such as lasers, for example, but is much more difficult to attain. A stabilized laser oscillator is extremely useful in a linear measurement system, for example, and also has many advantageous metrological applications. Furthermore, it can be used as a source to make accurate gain linewidth measurements and investigations of single atom coherence effects in lasers.

Ordinary electronic RF oscillators are usually stabilized by referencing to some stable controlling element such as a piezoelectric crystal. The crystal oscillator is intrinsically orders of magnitude more stable than the frequency determining elements in the oscillator, such as LC circuit parameters. The problem with optical oscillators is that there are no known frequency determining elements related to lasers as crystals are related to LC oscillators because the optical oscillation frequency is so very high. One drawback of most laser oscillators to date is that the actual oscillation frequency is determined to the first order by the cavity spacing, which means a device capable of extremely high purity frequency output over a long time period is limited by the mechanical stability of the cavity. The two principal causes of mechanical instability are microphonics, including acoustic effects, and thermal drift. A third possible source of drift is atmospheric pressure changes which can be neglected here since it can easily be eliminated by conventional means.

The usual way of stabilizing a laser oscillator has been to isolate it from thermal and mechanical shock. Usually this involves immersing the laser cavity in as nearly a constant as possible temperature bath such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity such as scattering from dust particles, etc., that afflict Brewster angle lasers with externally mounted mirrors, for example. Also, servo systems have been devised to keep the total output intensity maximum. However, this technique is too insensitive to stabilize the oscillator to within better than some tens of megacycles.

In contrast to the prior art, the invention to be described herein has the advantage of utilizing as the frequency determining factor, atomic rather than mechanical means and the first order dependence of the laser oscillation frequency on cavity length is used to control the output frequency.

It is therefore an object of the present invention to provide an improved stabilized single mode laser oscillator.

It is another object of the invention to provide a tunable frequency stabilized single mode laser oscillator.

It is still another object of this invention to provide a tunable and stabilized laser oscillator wherein the frequency determining factor is atomic rather than mechanical.

It is yet another object of the present invention to provide a tunable frequency stabilized single mode laser oscillator that does not require the immersion of the laser cavity in constant temperature bath or the mounting of the cavity on a vibration-free and isolated platform.

These and other objects of the invention are obtained in a tunable, frequency stabilized laser oscillator having a tunable single mode laser oscillator capable of producing at least one output laser beam of optical frequency energy coupled to a phase comparison interferometer wherein the output laser beam from the oscillator is split into two components propagating along different paths before being recombined as an output signal beam. One of these paths has the capability of amplifying optical energy while the other path includes an optical phase modulation element. The output signal beam is then detected and any variations in intensity due to phase relationships between the two components will be represented by a DC output signal and fed to a servo system that utilizes this DC signal to vary the frequency of the tunable laser oscillator accordingly.

The invention and specific embodiments thereof will be described hereinafter by way of example and with reference to the accompanying drawings wherein like reference numerals refer to like elements or parts and in which:

FIG. 1 is a schematic block type diagram of the basic structure of the invention;

FIG. 2 illustrates gain and dispersion functions for a laser transition of half with $\Delta\gamma\alpha$;

FIG. 3 is a schematic diagram of a preferred embodiment of the invention; and

FIG. 4 is a schematic diagram of a feedback control system that may be used with the invention.

With reference now to the drawings and more particularly to FIG. 1, there is shown a schematic block diagram of the basic aspects of the invention. As can be seen, a tunable single mode laser oscillator 11 produces a laser beam 13 which is directed toward an input beam splitter assembly 15 of a phase comparison interferometer 17.

The interferometer 17 also includes an output beam splitter assembly 19, a passive arm 21 containing an optical phase modulation element 23, to be described more fully later, and an amplifying arm 25. The input beam splitter 15 includes a partially transmissive mirror 27 which splits the beam into two but not necessarily equal components designated here as $E_r$ (reference component) and $E_i$. The component $E_r$ is reflected by mirror 27 and again by a totally reflective mirror 29 so as to cause the component $E_r$ to propagate through the passive arm 21 and the element 23 and through a partially silvered mirror 31. The component $E_i$ on the other hand, is transmitted through the mirror 27, the amplifying or active arm 25 and is reflected toward the mirror 31 by a totally reflective mirror 33 located along with the mirror 31 in the output beam splitter assembly 19. The component $E_i$ is then totally reflected by the mirror 31 so that the components $E_r$ and $E_i$ are recombined at the mirror 31 to form an output signal beam 35 which is directed toward an intensity detector 37.

For purposes of explanation of the operation of the invention as shown in FIG. 1, the path length of the reference component $E_r$ is designated $\Delta_r$ and that of the component $E_1$ is designated $\Delta_a$ which varies depending on whether the amplifier arm 25 is amplifying or not.

The detector 37 is adapted to provide DC output signal which is directly related to the intensity of the output signal beam 35 detected thereby. The DC signal is coupled to a conventional null seeking servo 39 which in turn is coupled to the laser oscillator 11 in a manner that will provide for a change in the frequency of the laser output beam 13 corresponding to a change in the DC output signal from the detector 37. A more complete description of the servo system and the interferometer will be made below.

As noted before, the laser beam 13 is split into two components $E_r$ and $E_a$ within the interferometer 17 and then recombined. The recombined signal has been designated here as output signal beam 35 which thus comprises the reference component $E_r$ and the amplified component $E_a$ which is equal to $GE_1$ since this component passed through the amplifying arm 25 which accounts for the gain multiplier G. No matter what the frequency of the laser beam 13 happens to be, the two components are always of the same frequency and differ only in phase due to the effective difference in optical path lengths $(\Delta_r - \Delta_a)$. The resulting intensity at the detector 37 and at a given point in its field of view will vary with phase difference between the two components as follows:

$$I = a(b + \cos \Phi) = \frac{I_{max} - I_{min}}{2} \cdot \frac{I_{max} + I_{min}}{I_{max} - I_{min}} + \cos \Phi$$

where $a$ and $b$ are constants and $$\Phi = \frac{2\pi}{\lambda}(\Delta_r - \Delta_a)$$

The amplifier arm 25 introduces a symmetric gain $g(\gamma)$ and an assymetric phase shift $\phi(\gamma)$ about the transition center frequency $\gamma_0$ as indicated in FIG. 2. The maxima and minima of $\phi(\gamma)$ fall approximately at the half width frequencies of $g(\gamma)$. For all gas lasers known to date, the linewidth for gain is determined by Doppler broadening, hence $g(\gamma)$ has a gaussian shape. The change in phase due to the presence of the active medium of arm 25 is $$\varphi = \frac{2\pi}{\lambda} l(n - 1)$$

where $\lambda$ is the wavelength and $l$ is the path length in the active medium of index $n$.

The phase shift $\varphi$ and the single pass gain are related through the Kramers-Kronig relations. The extent that this approach is valid for a high gain line, it can be shown that the phase shift for a Doppler broadened (gaussian) line is $$\varphi = \frac{g_0 l}{\pi} F(\omega)$$

where $$\omega = 2\sqrt{\log_e 2} \frac{(\gamma - \gamma_0)}{\Delta \gamma_D}$$

$\Delta_{\gamma D}$ is the Doppler width, $g_0$ is the peak again at line center, and $F(\omega)$ is the normalized dispersion function. $F(\omega)$ has extreme values of $\pm 0.538$ at $\omega = \pm 1$ as can be verified by reference to the text by A. C. G. Mitchell and M. W. Zemansky entitled Resonance Radiation and Excited Atoms published by Cambridge University Press, London, 1934. Thus, the maximum possible phase shift in either directions from line center may be written $$\varphi(\text{rad}) = 0.304 g_0 l = 0.070 G_0(\text{dB}) \text{ since } G_0 = e^{g_0 l}$$

and $$g_0 l = G_0(\text{dB})/4.34$$

The null seeking serve 39 may be utilized to control the cavity spacing and hence the oscillator frequency of the laser oscillator 11, for example by operating off an intensity minimum at the detector 37. The derivative of the signal 35 at the detector 37 will determine the direction the frequency of oscillation should be moved to maintain $I_{min}$. The derivative may be obtained by operating the optical phase modulator element 23 at some reasonable rapid audio rate by appropriate electrical means. The element 23 could be made from a material whose refractive index varies with an applied electric field to provide a phase modulation of $\delta\Delta_r$ such as potassium dihydrogen phosphate (KDP), for example. The gain of the amplifying arm 25 should be high enough such that intensity variations due to phase changes as the oscillator 11 drifts will provide sufficient sensitivity control. However, it is obvious that the gain should be kept less than that which will provide a $2\pi$ radians phase shift across the gain linewidth. For example, a gain of 30 db would imply 4.2 radians phase shift between maxima and minima which is a sufficiently large gain and yet which provides less than $2\pi$ radians phase shift. It is here again noted that the mirror 27 need not split the beam 13 into two equal components. It would be preferred that the component transmitted be less than that reflected to provide more nearly equal magnitude of these components when they recombine at the mirror 31 taking into consideration the amplification of that component propagating through the amplifying arm 25.

With the amplifying characteristic of the amplifying arm initially turned off, the system is set up and the modulation $\delta\Delta_r$ of the modulation element 23 statically adjusted to give $I_{min}$ at the detector 37. The laser oscillator may be oscillating anywhere within its gain linewidth. Upon turning on the amplifying arm 25 of the interferometer 17, a phase change is introduced if the oscillator is not at line center, and the servo 39 will automatically send a correction signal to an appropriate change in frequency such that the former phase condition is reproduced giving $I_{min}$ at the detector 37. The amplifier arm 25 should be designed to operate at an unsaturated condition because then its gain linewidth will be minimum. It has been observed in the laboratory that the gain linewidth can vary be as much as a factor of 2.5 between the saturation and unsaturated regimes.

Now it should be clear to see that by variation of the means value of phase change introduced by the modulation element 23, it is possible to tune the laser oscillator 11 to oscillate anywhere within the half power points of its gain linewidth. Since the servo 39 seeks to maintain a null at the detector 37, a change in the means phase shift value introduced by the modulation element 23 will force the servo 39 to tune the oscillator to the frequency such that the corresponding phase shift introduced by the amplifying arm 25 compensates for the $\delta\Delta_r$ phase modulation of the element 23.

It may at first appear that the problem of mechanical stability (hence frequency stability) of the laser oscillator has simply been transferred to the mechanical stability characteristic of the phase comparison interferometer 17. This is not the case since the interferometer 17 is a single pass, two beam device. As indicated in FIG. 1, the beam splitter assemblies 15 and 19 can be integral units. If the mechanical mount separating the beam splitters at each end varies due to thermal or microphonic effects, each path $\Delta_r$ and $\Delta_a$ will vary exactly together except for angular tilt effects. This might rotate one beam splitter assembly 15 with respect to the other assembly 19 and thus produce a change in phase $\Phi$ causing the servo to hunt about these fluctuations. The above will obviously be minimized the more nearly the separate physical path lengths are made equal in the alignment process. Of course, it has been assumed that stability of the amplifying arm 25 is not a problem. Variations in this section would result in variations in $\Phi$ and would result in hunting.

With reference to FIG. 3, a preferred embodiment of the invention as generally described in conjunction with FIGS. 1 and 2 is illustrated. The laser oscillator 11 consists of a mechanically tunable single mode gas laser oscillator in a hemispherical configuration of a flat mirror 51 and a spherical mirror 53 separated by the radius of curvature of the spherical mirror. The laser 11 here is shown producing a laser beam 13 directed toward the interferometer 17 and a more powerful laser output beam 55 in the opposite direction by the use of partially transmissive mirrors or by other conventional means.

Tuning is accomplished by linear motion of the flat mirror 51 which is mounted on a piezoelectric element 57 such as barium titanate or similar type material. The length and bore of the oscillator tube (not shown) may be chosen consistent with the fundamental axial mode spot size determined by the radius of the spherical mirror to ensure single transverse mode operation. Also, single axial mode operation may be obtained by choosing cavity length (distance between the mirrors), $d$, short enough such that the cavity mode spacing $\Delta_c = c/2d$ exceeds the gain linewidth for the laser transition.

The phase comparison interferometer 17 may comprise, as shown, a reference arm 21 and an amplifying arm 25, both filled with the same active gas as used in the laser oscillator 11 such as He-Ne. A glow discharge may be established in the amplifying arm 25 for amplification purposes by connecting an appropriate source (not shown) to an anode terminal 59 and a hot cathode terminal 61 disposed along the arm 25. Of course, care must be exercised to assure that the terminals are properly electrically insulated from each other. In order to lessen stresses in the arms of the interferometer, metal bellows portions 63 and 65 in the arms 21 and 25, respectively, may be utilized.

As can be seen from FIG. 3, the detector 37 comprises a photodetector 71 enclosing a certain field of view with resolution fixed by a diverging optics assembly 73 and an aperture or slit 75. The resulting intensity of the signal beam 35 at the photodetector 71 will be a series of fringes of the two slit interference type and at a given point in the field of view will vary with phase difference $\phi$ between the two components $E_r$ and $E_i$ as described before.

A schematic diagram of a feedback control system is shown in FIG. 4. The optical phase modulation element 23 is driven here by an audio frequency generator 81 which also provides a synchronizing or reference signal to the servo 39. The output from the detector 37 is amplified to a useful magnitude by an amplifier 83 which may be of the tuned type responsive at the frequency of the signal produced by the generator 81. As described previously, the output signal from the servo 39 may be coupled by either electrical or mechanical or combination thereof to a frequency determining element of the laser oscillator 11 such as the flat mirror 51.

From the foregoing, it should be seen that the invention provides an improved tunable stabilized single mode laser oscillator wherein the frequency determining factor is atomic rather than mechanical and that does not require the immersion of the laser oscillator cavity in a constant temperature bath or the mounting of the cavity on a vibration-free and isolated platform.

In practicing the invention, any active laser material may be used in the laser oscillator and the interferometer arms.

It is intended that the foregoing disclosure and drawings shall be considered only as illustrations of the principles of this invention and are not to be construed in a limiting sense.

What is claimed is:

1. A tunable, frequency stabilizer laser oscillator comprising:
    a tunable single mode laser oscillator capable of producing at least one output laser beam of optical frequency energy;
    a phase comparison interferometer wherein said output laser beam is split into two components propagating along different paths before being recombined as an output signal beam, only one of said paths being capable of amplifying that component of said laser beam propagating therethrough, the other of said paths including an optical phase modulation element through which the other component of said beam propagates;
    means for detecting the intensity of said output signal beam and for providing a DC output signal directly related to the intensity of said output signal beam; and
    means coupled to said laser oscillator and said DC output signal for tuning the frequency of said output laser beam produced by said laser oscillator in accordance with the amplitude and polarity of said DC output signal.

2. A tunable, frequency stabilized laser oscillator comprising:
    a tunable single mode laser oscillator capable of producing at least one output laser beam of optical frequency energy;
    a phase comparison interferometer wherein said output laser beam is split into two components propagating along different paths before being recombined as an output signal beam, only one of said paths being capable of amplifying that component of said laser beam propagating therethrough, the other of said paths including an optical phase modulation element through which the other component of said beam propagates;
    means for detecting the intensity of said output signal beam and for providing a DC output signal directly related to the intensity of said output signal beam; and
    means including a null seeking servo coupled to said laser oscillator and said DC output signal for providing a change in the frequency of said laser oscillator corresponding to a change in said DC output signal.

3. A tunable, frequency stabilized laser oscillator comprising:
    a tunable single mode laser oscillator capable of producing at least one output laser beam of optical frequency energy;
    a phase comparison interferometer wherein said output laser beam is split into two components propagating along different paths before being recombined as an output signal beam, only one of said paths being capable of amplifying that component of said laser beam propagating therethrough, the other of said paths including an optical phase modulation element through which the other component of said beam propagates;
    means for detecting the intensity of said output signal beam and for providing a DC output signal directly related to the intensity of said output signal beam;
    means including a diverging optics assembly, an aperture element and a photodetector in linear arrangement disposed along the path of said output signal beam for providing a DC output signal directly related to the intensity of said output signal beam; and
    means including a null seeking servo coupled to said laser oscillator and said DC output signal for providing a change in the frequency of said laser oscillator corresponding to a change in said DC output signal.

4. A tunable, frequency stabilized laser oscillator comprising:
    a tunable single mode laser oscillator capable of producing at least one output laser beam of optical frequency energy;
    a phase comparison interferometer wherein said output laser beam is split into two components propagating along different paths before being recombined as an output signal beam, only one of said paths being capable of amplifying that component of said laser beam propagating therethrough, the other of said paths including an optical phase modulation element through which the other component of said beam propagates;

means for detecting the intensity of said output signal beam and for providing a DC output signal directly related to the intensity of said output signal beam;

means including a diverging optics assembly, an aperture element and a photodetector in linear arrangement disposed along the path of said output signal beam for providing a DC output signal directly related to the intensity of said output signal beam; and means including a null seeking servo system including a DC amplifier coupled to said photodetector and an audio frequency generator coupled to a servo arrangement and to said optical phase modulation element, said servo system being coupled to said laser oscillator for providing a change in the frequency of said laser oscillator corresponding to a change in said DC output signal.

5. A tunable, frequency stabilized laser oscillator comprising:

a mechanically tunable single mode gas laser oscillator having a hemispherical resonant cavity configuration including a flat mirror and a spherical mirror separated by the radius of curvature of said spherical mirror, said flat mirror being mounted on a piezoelectric element adapted to provide linear motion to said flat mirror when said piezoelectric element is energized, said laser oscillator producing at least one output laser beam;

a phase comparison optical frequency interferometer coupled to said output laser beam, said interferometer including an input beam splitter assembly adapted to split said output laser beam into two components, one of which propagates through a reference arm and the other of which is caused to propagate through an amplifying arm, both arms being filled with the same active gas as used in said laser oscillator, said amplifying arm having anode and cathode terminals for connection to a source of potential of a value sufficient to establish a glow discharge for amplification purposes, said reference arm including an optical phase modulation element adapted to modulate that component propagating through said reference arm, said arms each having a strain relieving metal bellows disposed therein, said interferometer also including an output beam splitter assembly adapted to recombine said two components into an output signal beam;

an intensity detector configuration including a diverging optics assembly and an aperture element disposed along the path of said output signal beam to fix the resolution of a predetermined field of view, said detector configuration also including a photodetector enclosing said predetermined field of view whereat there is presented an intensity variation dependent upon the phase difference between said two components; and a servo system coupled to said photodetector and to said piezoelectric element to energize said piezoelectric element.

References Cited

UNITED STATES PATENTS 3,361,990   1/1968   Gordon et al. _____ 331—94.5

JOHN KOMINSKI, *Primary Examiner.*